No. 767,949. PATENTED AUG. 16, 1904.
H. LUTZ.
VEHICLE TIRE.
APPLICATION FILED MAY 14, 1904.
NO MODEL.
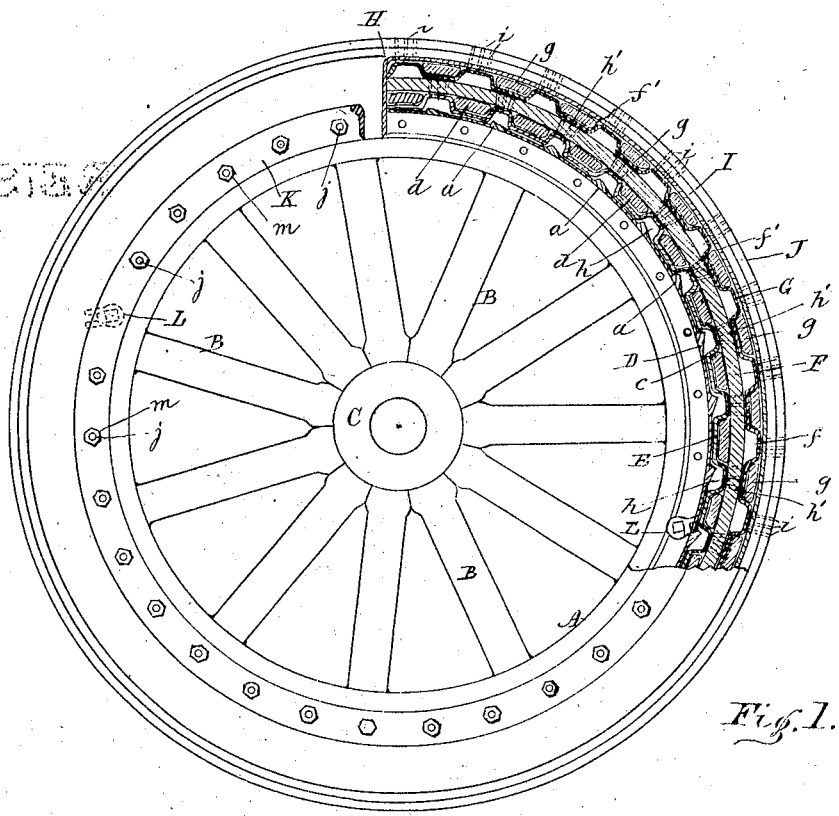
Fig. 1.
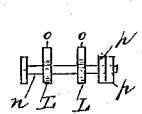
Fig. 3.
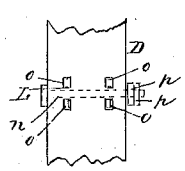
Fig. 4.
Fig. 5.
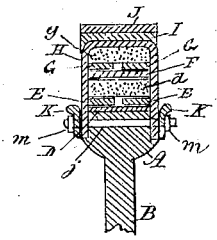
Fig. 2.
Witnesses
R. A. Marshall
Percy Rooney
Inventor
Herbert Lutz
By Wm Bruce
Atty.

No. 767,949.

Patented August 16, 1904.

UNITED STATES PATENT OFFICE.

HERBERT LUTZ, OF HAMILTON, CANADA, ASSIGNOR OF TWO-FIFTHS TO BENJAMIN HARRIS, OF HAMILTON, CANADA.

VEHICLE-TIRE.

SPECIFICATION forming part of Letters Patent No. 767,949, dated August 16, 1904.

Application filed May 14, 1904. Serial No. 208,012. (No model.) REISSUED

*To all whom it may concern:*

Be it known that I, HERBERT LUTZ, a citizen of the Dominion of Canada, residing at No. 252 Mary street, in the city of Hamilton, in the county of Wentworth, in the Province of Ontario, Canada, have invented certain new and useful Improvements in Vehicle-Tires; and I do hereby declare that the following is a full, clear, and exact description of the construction and operation of the same.

The invention relates to improvements in vehicle-tires more particularly adapted for use with automobiles.

The object of the invention is the construction of strong, durable tires for wheeled vehicles, particularly automobiles, that will dispense with the pneumatic or compressed-air tire, which is liable to be punctured, and the costly solid-rubber tires, &c., at much less cost and more permanent, and also possess the advantage of capability of being tightened or expanded to suit the load being carried, which cannot be done with the solid-rubber tires. I attain these objects by mechanism illustrated in the accompanying drawings, in which—

Figure 1 is a plan view, partly in section, of a vehicle wheel and tire embodying my invention. Fig. 2 is a cross-section of the rim and tire. Fig. 3 is a side view of tightening device and bolt. Fig. 4 is an end view of the tightening device. Fig. 5 is a top view of the same.

Similar letters refer to similar parts throughout the several views.

In the drawings, A represents the felly or rim of a wood wheel of any desired size and thickness; B, the spokes, which may be of iron or wood.

C is the hub, of iron or wood.

D is a loose metal strip about one-sixteenth of an inch thick and the full width of the rim placed around the felly. It is provided with a series of wedge-shaped projections *a* on its outer side, which are used for tightening up the tire, as will be further described hereinafter.

E E are two strips of a material—such as leather, canvas, or like substances—made to encircle the rim over the strip D, and they are formed in corrugations, so as to leave a series of recesses, which are arranged upper and lower alternately. The lower or inner ones, *h*, are for the purpose of affording room for the wedge-shaped projections *a* on the loose strip D to operate in and the outward recesses *c* to each receive a cushion *d*, of an elastic substance, such as rubber or its equivalent material. On the outside of the said rubber cushions *d* is a band F, of a material such as leather, made to cover the said cushions all around the wheel. On the outside of the said band F is placed another corrugated pair of straps G, formed with a series of corrugations or recesses *f* on the inner side for air-spaces and larger recesses *f'* on the upper side to contain rubber cushions *g* or equivalent elastic material. The two corrugated strips E and G are fastened together with the strip F by a series of groups of nails or rivets *h'* or stitched together in lieu thereof.

H is a covering of leather, canvas, or like material made to inclose the parts described to exclude dust and like substances from entering the tire.

I is a band or belt of leather encircling the outer covering H as an outer tire to take off the wear and tear of the tire and an extra outer tire J, of leather or like material, is placed on and over the said band or belt I and the bands secured together with the strap G by means of nails *i*, rivets, or stitching.

K K are metal bands bolted to the sides of the felly or rim A, the bolts *j* passing through both bands and the felly. This holds the leather or other covering material H in a firm and solid manner. The said bolts *j* are tightened by nuts *m*.

The means for tightening and loosening the metal strip D may be described as follows: L is a tightening device consisting of two plates having each a square central opening for admitting a bolt *n* and also provided with two projections *o o*. The said device is let into recesses in the face of the rim or felly, so that the two said projections *o o* are made to enter corresponding openings in the metal strip D for the purpose of expanding and loosening the tire when the square bolt-head is turned when desired with a wrench. There are two nuts $p$ $p$ on the outer ends of the bolt to lock it firmly in place.

It will be observed that the central band F will be put on a little loose, so as to be capable of being tightened, if desired.

Having thus described my device and its advantages, what I claim as my invention, and desire to secure by Letters Patent, is—

1. In combination with the felly of a vehicle, a tire consisting of a loose metallic strip on the outside of the felly constructed with a series of wedge-shaped projections on the outer side, a corrugated strip of material as leather, placed over the said metallic strip, the under recesses or compartments for the said wedge-shaped projections, rubber cushions to fill the upper recesses, a loose central band of material, as leather, placed over the said rubber cushions, then a second corrugated band of leather or like material, placed over the said central strip, and incased on the outside and sides with a covering of leather or like material, then on the outside a thick covering band or belt of leather or like material, and on the extreme outside another thick band or belt placed over all as an outside tire and the parts all well secured together by nails or rivets forming an improved tire that will be at once elastic, durable and punctureless, substantially as described.

2. In combination with the felly of a vehicle a tire consisting first of a loose metallic strip, capable of being tightened and slackened as desired placed on the outside of the rim or felly of a vehicle-wheel the said strip constructed with a series of wedged-shaped projections on the upper side, a corrugated strip of material as leather placed over the said metallic strip, the projections of the said strip made to lodge in the lower or under recesses of the corrugated belt, and the upper or outward recesses of the belt to contain a series of elastic cushions as rubber, a central band of tough material as leather is placed loosely over the said rubber cushions, then a second corrugated band with upper and lower recesses of tough material as leather is placed over the said central strip, the whole being incased on the outside and sides with a covering of a tough material as leather, and on the extreme outside of the wheel two separate bands or belts placed over all and secured together for an outside protection of the inside parts, and devices for tightening or slackening the tire, substantially as and for the purpose specified.

Hamilton, Ontario, Canada, May 2, 1904.

HERBERT LUTZ.

In presence of—
 ROBT. M. GARDNER,
 WM. BRUCE.